(12) United States Patent
Pierre et al.

(10) Patent No.: US 12,033,521 B2
(45) Date of Patent: Jul. 9, 2024

(54) MACHINE LEARNING IN AVIONICS

(71) Applicant: THALES, Courbevoie (FR)

(72) Inventors: Christophe Pierre, Toulouse (FR);
Dorian Martinez, Toulouse (FR);
Bastien Crete, Toulouse (FR)

(73) Assignee: THALES, Courbevoie (FR)

( * ) Notice: Subject to any disclaimer, the term of this patent is extended or adjusted under 35 U.S.C. 154(b) by 731 days.

(21) Appl. No.: 16/716,160

(22) Filed: Dec. 16, 2019

(65) Prior Publication Data
US 2020/0202723 A1    Jun. 25, 2020

(30) Foreign Application Priority Data

Dec. 20, 2018  (FR) ...................................... 1873514

(51) Int. Cl.
| | | |
|---|---|---|
| *G08G 5/00* | (2006.01) | |
| *G06N 3/044* | (2023.01) | |
| *G06N 3/045* | (2023.01) | |
| *G06N 3/047* | (2023.01) | |
| *G06N 3/08* | (2023.01) | |
| *G06N 20/00* | (2019.01) | |

(52) U.S. Cl.
CPC .............. *G08G 5/0034* (2013.01); *G06N 3/08* (2013.01); *G06N 20/00* (2019.01); *G08G 5/0021* (2013.01)

(58) Field of Classification Search
None
See application file for complete search history.

(56) References Cited

U.S. PATENT DOCUMENTS

| | | | |
|---|---|---|---|
| 8,600,675 B1* | 12/2013 | Borghese ............... | G01C 23/00 |
| | | | 701/528 |
| 9,290,262 B2 | 3/2016 | Laso-Leon et al. | |
| 9,542,851 B1* | 1/2017 | Kim ..................... | G08G 5/0052 |
| 2009/0112535 A1* | 4/2009 | Phillips .................. | G06Q 10/04 |
| | | | 703/2 |
| 2014/0244077 A1* | 8/2014 | Laso-Leon ........... | G05D 1/0005 |
| | | | 701/4 |
| 2016/0314692 A1 | 10/2016 | Bahrami et al. | |
| 2017/0197727 A1 | 7/2017 | Kim et al. | |
| 2018/0259342 A1 | 9/2018 | Bitra et al. | |
| 2018/0348250 A1 | 12/2018 | Higgins et al. | |
| 2019/0033848 A1* | 1/2019 | Cella ................ | G05B 19/41865 |

FOREIGN PATENT DOCUMENTS

| | | |
|---|---|---|
| CN | 106971234 A | 7/2017 |
| WO | 2017/042166 A1 | 3/2017 |

* cited by examiner

*Primary Examiner* — Aniss Chad
*Assistant Examiner* — Mahmoud M Kazimi
(74) *Attorney, Agent, or Firm* — BakerHostetler

(57) ABSTRACT

Systems and methods for managing the flight of an aircraft, include the steps of receiving data from recordings of the flight of an aircraft; the data comprising data from sensors and/or data from the onboard avionics; determining the aircraft state at a point N on the basis of the received data; determining the state of the aircraft at the point N+1 on the basis of the state of the aircraft at point N by applying a model learnt by means of machine learning. Developments describe the use of the flight parameters SEP, FF and N1; offline and/or online unsupervised machine learning, according to a variety of algorithms and neural networks. Software aspects are described.

16 Claims, 4 Drawing Sheets

MACHINE LEARNING IN AVIONICS

CROSS-REFERENCE TO RELATED APPLICATIONS

This application claims priority to foreign French patent application No. FR 1873514, filed on Dec. 20, 2018, the disclosure of which is incorporated by reference in its entirety.

FIELD OF THE INVENTION

The invention relates to the field of avionics in general. In particular, the invention relates to methods and systems for predicting the future state of an aircraft.

BACKGROUND

The approaches known from the prior art (e.g. WO 2017042166 or U.S. Pat. No. 9,290,262) are generally based on a dataset modelling the performance of an aircraft.

Various approaches for modelling aircraft performance are known. Tools such as "BADA" (acronym for "Base of Aircraft Data") or "Safety-Line" by EUCASS ("European Conference for Aeronautics and Space Sciences") have limitations. The BADA model is limited in terms of thrust and drag. The EUCASS model is applicable only to aircraft propelled by turbojets (i.e. N1-driven).

Technical problems in aeronautics generally involve many different parameters and thus the optimizations available currently converge little, poorly or do not converge at all. This lack of convergence (or of convergence towards local minima) is specifically often observed when the processes being modelled are of large-scale (and follow different models depending on viewpoint).

The approaches based on models incorporating physical equations of the aircraft are generally dependent on the quality of the model and on knowledge of the actual behaviour of the aircraft. In fact, these models are generally not robust when faced with variability in the actual behaviour of a given aircraft in comparison with that of an "average" (modelled) aircraft.

There is an industrial need for advanced methods and systems for optimizing all or some of the operations of an aircraft.

SUMMARY OF THE INVENTION

The document relates to systems and methods for managing the flight of an aircraft, comprising the steps of receiving data (200) from recordings of the flight of an aircraft; the data comprising data from sensors and/or data from the onboard avionics; determining the aircraft state at a point N (220) on the basis of the received data (200); determining the state of the aircraft at the point N+1 (240) on the basis of the state of the aircraft at point N (20) by applying a model learnt by means of machine learning (292). Developments describe the use of the flight parameters SEP, FF and N1; offline and/or online unsupervised machine learning, according to a variety of algorithms and neural networks. Software aspects are described. A method is described for managing the flight of an aircraft, comprising the steps of: receiving data from recordings of the flight of an aircraft; the data comprising data from sensors and/or data from the onboard avionics; determining the aircraft state at a point N on the basis of the received data; determining the state of the aircraft at the point N+1 on the basis of the state of the aircraft at point N by applying a model learnt by machine learning. In this embodiment, the learning takes place end-to-end, i.e. it comprises the PERFDB (performance-calculation) step and the TRAJ/PRED trajectory-calculation step; the output data are determined directly by learning implemented on the input data.

In one embodiment, the step of determining the state of the aircraft at point N+1 on the basis of the state of the aircraft at point N comprises the steps of: determining the flight parameters SEP, FF and N1 on the basis of the aircraft state at point N by applying a model learnt by machine learning; and determining the aircraft state at point N+1 on the basis of the values of flight parameters SEP, FF and N1 by means of trajectory calculation, wherein the SEP value denotes the energy available for the aircraft to climb, the FF value denotes the variation in the fuel weight and the N1 value denotes the speed of rotation of the first stage of the engine, which influences fuel consumption.

In one embodiment, the machine learning is unsupervised. Unsupervised learning aims to find subjacent structures on the basis of untagged (or unlabelled) data. Class number and definition are not given a priori. This type of learning comprises for example deep learning techniques. The advantages associated with this type of learning include the use of substantial computing power on accumulated big data, no need for human control and the discovery of trends, patterns or relationships which are not necessarily possible for a human to understand but which may be effective.

In one embodiment, the machine learning is supervised. Advantageously, some attributes of the data may be known, e.g. SEP, N1 or FF. The expected outputs are known, and the recording classes or categories are known (tags, labels). Supervised learning allows manual intervention and hence may produce efficient models, for example ones that converge more rapidly. Conversely, human presuppositions may limit the possibilities (there are no such limits in the unsupervised case).

In one embodiment, the machine learning is performed offline. The recordings may be recordings of past flights (data-mining approaches). This embodiment is advantageous in that it allows existing data (of which there are a lot and these data are currently underused) to be reused.

In one embodiment, the machine learning is performed online. In one embodiment, the machine learning may be performed incrementally or online. From an average generic model (aircraft type or series), a particular aircraft may be characterized, and this gradually refined, as it makes its own flights (by serial or tail number). When the model is known, it is possible to continue learning by data stream (to improve the existing model without starting from scratch). Offline machine learning learns on the basis of a complete dataset while online learning may continue to learn (transfer learning), on board, without having to re-ingest the starting data.

It should be noted that the machine learning implemented in the method according to the invention may comprise both types of learning: offline learning which allows for example the generic aircraft model to be parametrized and online learning which then allows the model that is unique to each particular aircraft to be parametrized. (However, offline learning may also be used to specify a particular aircraft.) It is also possible to use only one type of learning (one airline may be interested only in the aircraft class while another airline will want to know the specific characteristics of a given aircraft, for example for fine optimization of fuel consumption).

In one embodiment, the machine learning comprises one or more algorithms selected from the algorithms comprising:

support-vector machines; classifiers; neural networks; decision trees and/or steps from statistical methods such as Gaussian mixture modelling, logistic regression, linear discriminant analysis and/or genetic algorithms.

What is described is a computer program product, said computer program comprising code instructions for performing one or more of the steps of the method when said program is executed on a computer.

What is described is a system for implementing one or more of the steps of the method, the system comprising one or more avionic systems such as a flight management system FMS and/or an electronic flight bag EFB.

In one embodiment, the system further comprises one or more neural networks chosen from the neural networks comprising: an artificial neural network; an acyclic artificial neural network; a recurrent neural network; a feedforward neural network; a convolutional neural network; and/or a generative adversarial neural network.

Advantageously, the methods according to the invention allow aircraft performance to be predicted, and independently of models provided by manufacturers.

Advantageously, the methods according to the invention allow learning to continue without time limit (e.g. online learning, in particular by reinforcement, by using the data streams from recordings of commercial flights).

Advantageously, the method according to the invention may be implemented in onboard trajectory-prediction and/or -calculation systems, and in particular in electronic flight bags (EFBs). The invention may be implemented in a computer such as an FMS (flight management system) or in a set of systems interconnecting the FMS with one or more EFBs.

The potential applications of the invention relate to calculating trajectories, assisting an aircraft manufacturer in establishing aircraft performance, optimizing flight operations for an airline, flight simulation, assisting in mission management, assisting in the piloting of an aircraft, adjusting avionic systems in a broader sense or predictive maintenance by modelling the variation in the performance of the aircraft.

BRIEF DESCRIPTION OF THE DRAWINGS

Various aspects and advantages of the invention will appear in support of the description of one preferred, but nonlimiting, mode of implementation of the invention, with reference to the figures below.

DETAILED DESCRIPTION

Figure 1:
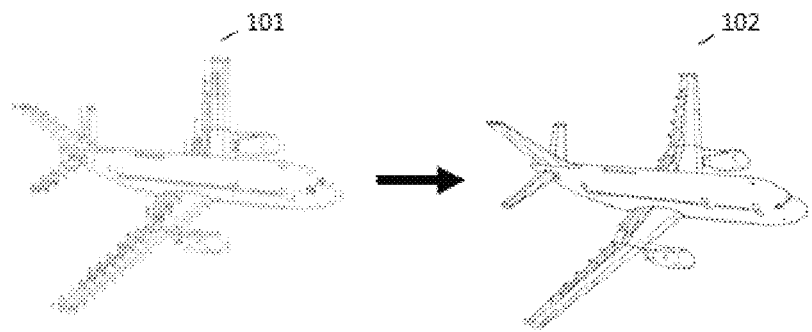
FIG. 1 illustrates some of the technical objectives pursued by the invention.

Various types of machine learning are possible. Machine learning is a field in computer science that uses statistical techniques to endow computer systems with the ability to "learn" using data (for example to gradually improve performance for a specific task) without being explicitly programmed for this purpose.

Machine learning is useful for detecting and recognizing trends, patterns or relationships. It is generally easier to gather data (for example data on a video or board game) than to explicitly write the program governing the game in question. Moreover, neural networks (hardware embodiment of machine learning, or software emulation) may be repurposed to process new data. Machine learning may be performed on particularly large amounts of data, i.e. by using as much data as possible (e.g. stability, convergence, weak signals, etc.) New data may be added continuously and the learning may be refined.

Various learning algorithms may be used, in combination with the features according to the invention. The method may comprise one or more algorithms from the algorithms comprising: support-vector machines (SVMs); "boosting" (classifiers); neural networks (in unsupervised learning); decision trees ("random forest"); statistical methods such as Gaussian mixture modelling, logistic regression, linear discriminant analysis and genetic algorithms.

Machine learning tasks are generally classified according to two large categories, depending on whether there is a "signal", or learning inputs, or "information feedback", or available outputs.

The expression "supervised learning" refers to a situation in which the computer is presented with exemplary inputs and exemplary outputs (whether real or desired). The learning then consists in identifying linking rules that match the inputs to the outputs (these rules may or may not be possible for a human to understand).

The expression "semi-supervised learning" refers to a situation in which the computer receives only an incomplete set of data: for example some output data are missing.

The expression "reinforcement learning" consists in learning the actions to take, on the basis of experimentation, so as to optimize a quantitative reward over time. Through iterative experimentation, a decision-making behaviour (referred to as strategy or policy, which is a function associating the action to be carried out with the current state) is determined as being optimal if it maximizes the sum of rewards over time.

The expression "unsupervised learning" (also referred to as "deep learning") refers to a situation in which there is no labelling (no explanation, description, etc.), leaving it to the learning algorithm alone to find one or more structures between inputs and outputs. Unsupervised learning may be an objective in itself (uncovering hidden structures in data) or a means for reaching an objective (learning by functionality).

In computer science, an "online algorithm" is an algorithm that, rather than receiving its input in one go, receives it as a data stream and must make decisions on the fly. In the context of machine learning, the term "incremental learning algorithm" may be used.

Since it does not have access to all of the data, an incremental learning algorithm must make choices that may turn out to be non-optimal a posteriori. It is possible to perform competitive analyses by comparing the performance, on the same data, of the incremental learning algorithm and of the equivalent having all of the data available to it. Online algorithms comprise in particular algorithms such as the k-server, BALANCE2, balanced-slack, double-coverage, equipoise, handicap, harmonic, random-slack, tight-span, tree and work-function algorithms. Online algorithms are related to probabilistic and approximation algorithms.

Depending on the embodiment, the human contribution in the machine-learning steps may vary. In some embodiments, machine learning is applied to the machine learning itself (reflexive). The entire learning process may in fact be automated, in particular by using a number of models and comparing the results produced by these models. In the majority of cases, humans participate in the machine learning ("human in the loop"). Developers or curators are responsible for maintaining data collections: data ingestion, data cleaning, model discovery, etc. in some cases, no human intervention is needed, and the learning is fully automated once the data have been made available.

Machine learning used in combination with the features of the invention generally benefits from having access to large amounts of data. The expression "big data" refers to the collection and analysis of data on a massive scale. This concept is associated with technical characteristics including: volume (e.g. large collections of data, even if they are redundant); variety (e.g. many different sources are used); velocity (e.g. the data are "fresh" or constantly updated in changing or dynamic environments); demonstrating a certain degree of veracity (e.g. weak signals which are drowned out by noise are not removed and may consequently be detected or amplified); ultimately to represent a certain value (for example usefulness from a technical and/or professional, i.e. business, point of view).

In one embodiment, an "on-policy" learning method may be used. On-policy methods are iterative methods alternating between policy-evaluation and improvement phases. They are based on the current estimation of the value (or quality) function in the current state to determine the choice of the next action (control); after observing the new current state and the received reinforcement signal, the model that has been used is updated. A classic example of this type of method is the SARSA algorithm.

In one embodiment, an "off-policy" learning method may be used. Off-policy methods are not sensitive to the way in which actions are selected at a given time, but instead only to observing a control policy having a sufficient degree of exploration. Because of this, they are free to observe a different control policy (which may be suboptimal). A classic example of an off-policy algorithm is the Q-learning algorithm.

FIG. 1 illustrates some of the technical objectives pursued by the invention.

For optimization, it is common practice to use models provided by manufacturers 101. These are generally generic, i.e. theoretical, static and data-poor. They relate to an "average" or "model" aircraft, which is difficult to manipulate or ultimately of little relevance in some contexts. In other words, there is a need for advanced aircraft models 102 which are "real", i.e. individualized (from one aircraft to the next), dynamic and based on large amounts of data (which are available anyway).

More specifically, it is advantageous to be able to specify the performance of a particular aircraft, in an individualized manner, in particular for optimization (for example for fuel consumption). According to the maintenance events performed on an aircraft, or depending on the mission (e.g. load distribution, etc.), the performance data may vary for one and the same aircraft (different loadings, dynamic aspect).

Being able to evaluate, in real time, on board or via remote computing, the instantaneous performance of an aircraft affords an airline, which has to manage a fleet of aircraft, a significant advantage.

The embodiments of the invention described below at least partially meet the needs stated above.

Figure 2:
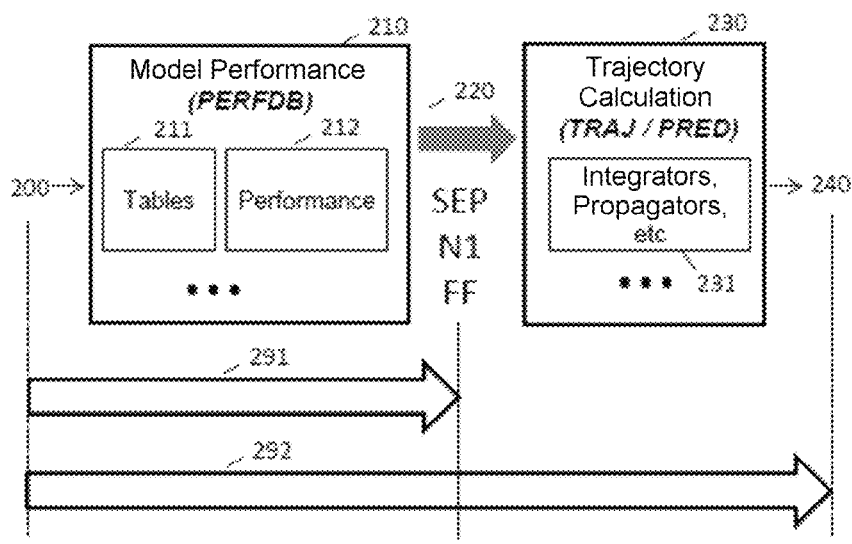
FIG. 2 illustrates the relationships between the performance model and the predictive trajectory calculation.

FIG. 2 illustrates the relationships between the performance model and predictive trajectory calculation.

A trajectory comprises a plurality of points, including the points N and N+1 (trajectory points, matching points on the flight plan, waypoints).

The performance model 210 (PERFDB) determines the aircraft state; it comprises tables 211 and one or more performance calculators 212. The tables 211 may be estimated (estimation of parameters from a parametric model based on actual flights).

The data from sensors or from the avionics 200 (e.g. aircraft state at point N) are manipulated, at input. At output, the parameters SEP, N1 and FF (220) are determined (directly or indirectly), at said point N.

These output parameters 220 are next used in the trajectory-calculation model 230 (integrators and propagators 231, etc.) which predicts the future (or next) state 240 of the aircraft on the basis of a present (or preceding) state.

Aircraft State

The state of the aircraft—at any given time—may in fact be characterized (approximately but satisfactorily) by three parameters, which are the parameters SEP, FF and N1. These parameters are data that can be measured by aircraft sensors, and are therefore accessible in flight recordings.

The acronym SEP, for "specific excess power", refers to the energy available for the aircraft to climb, i.e. the climb capacity of the aircraft divided by weight (this parameter is not constant). The SEP is not measured directly, but instead is calculated on the basis of measurable data (such as altitude, speed, gravitational constant, etc.).

The acronym FF, for fuel flow, refers to the variation in fuel weight.

$$FF = -\frac{dm}{dt} \qquad \text{[Math. 1]}$$

The acronym N1 refers to the speed of rotation of the first stage of the engine, which is the one that has the greatest effect on fuel consumption. Available power is strongly related to the speed N1.

The parameters SEP, FF and N1 are closely related. In particular, engine thrust mode and vertical guidance are determinants for the parameters SEP, FF and N1.

A model-based approach may consist in modelling the interdependence between SEP, FF and N1, i.e. by formulating sets of equations involving these parameters (for example by modelling aerodynamics and/or engine thrust mode and/or vertical guidance). Particularly efficient (e.g. convergent and fast) optimizations may thus be obtained.

Model-free approaches, based on machine learning.

According to one embodiment of the invention, one advantageous (model-free) alternative consists in applying machine-learning methods. No a-priori knowledge is required. In other words, no model, whether aerodynamic or engine, or other, is presupposed: machine learning matches sets of data at input and at output, these data being real data (i.e. measured directly or determined indirectly).

Various machine-learning methods may be applied, at various levels: between 200 and 220 on the one hand (machine learning 291) and between 200 and 240 on the other hand (machine learning 292).

Figure 3:
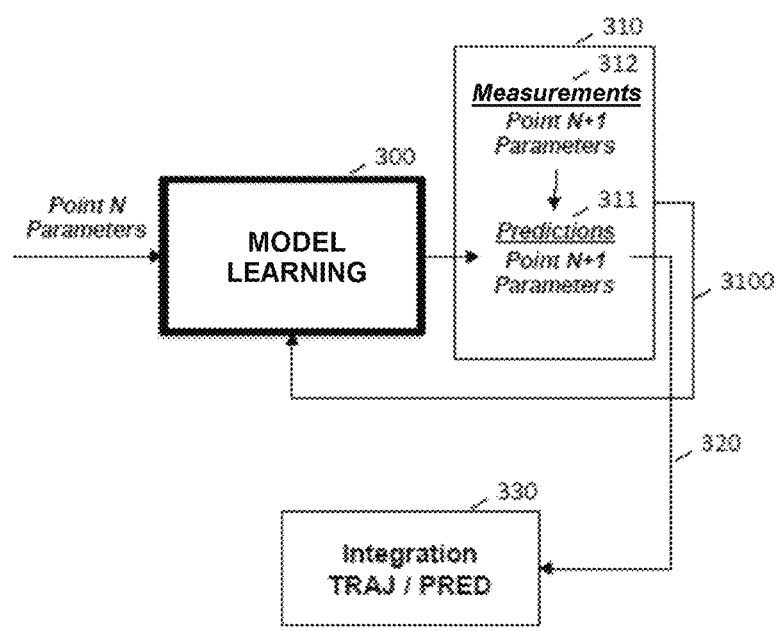
FIG. 3 illustrates the coupling between machine learning and integration within trajectory prediction.

FIG. 3 illustrates the coupling between machine learning and integration in trajectory prediction.

The integration calculation 330 for predicting the trajectory of the aircraft pertains only to the parameters predicted at point N+1 311, which are obtained by learning 300 on the basis of point N. The predicted 311 and measured 312 data are used to continue training 3100 the model 300.

The performance model 210 (PERFDB) determines the aircraft state; it comprises tables 211 and one or more performance calculators 212. The tables 211 may be estimated (estimate of parameters from a parametric model based on actual flights).

Data from sensors and/or from the avionics are manipulated, at input. At output, the parameters SEP, N1 and FF 220 are determined (directly or indirectly).

In one embodiment of the invention, these output parameters are used in the trajectory-calculation model 230 (integrators and propagators 231, etc.) which predicts the future (or next) state of the aircraft on the basis of a present (or proceeding) state.

The flight parameters at a point N are received (measured and/or calculated) then submitted to the learning model, which:

has batch-processed the data (unsupervised learning on a collection of data); or stream-processes the data (incremental or online learning, see below).

In one embodiment, the input data (inputs) are received and/or provided, as are the output data (outputs). Machine learning is performed on the output data and the learning then establishes "links" between inputs and outputs.

In one ("differential") embodiment, the differences between the data predicted by learning and the data actually measured in flight potentially modify the learnt model. The predicted data and/or the measured data are manipulated by the flight computers.

Figure 4:
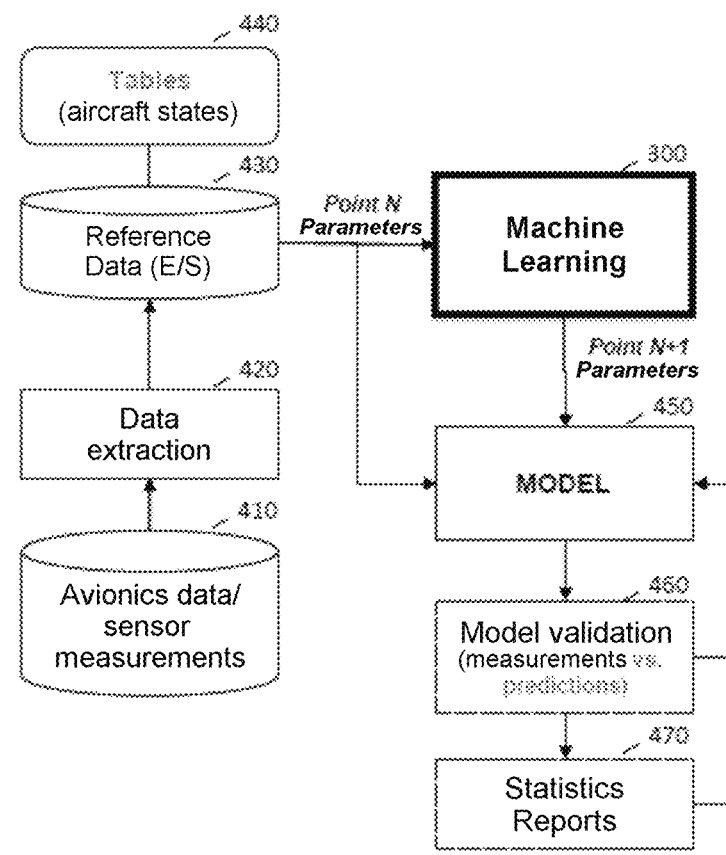
FIG. 4 illustrates some aspects of the invention according to a specific processing chain.

FIG. 4 illustrates some aspects of the invention according to a specific processing chain.

Measurements from sensors and/or calculations and/or other observations are collected in step 410 and possibly filtered and formatted in step 420; a "reduced" i.e. reference corpus is defined in step 430 (feedback via human expertise and/or machine filtering) and aircraft-state tables 440 comprising a plurality of aircraft states are determined. By considering a particular aircraft state, the learning model 300 predicts an aircraft state at the next point N+1 on the basis of data at the preceding point N. The learnt model 450 is gradually and/or iteratively refined, and possibly validated or modified 460 by an operator, and may optionally be the subject of reports and statistics 470 (for certification authorities, traffic-control authorities, the manufacturer, an equipment manufacturer, etc.).

Figure 5:
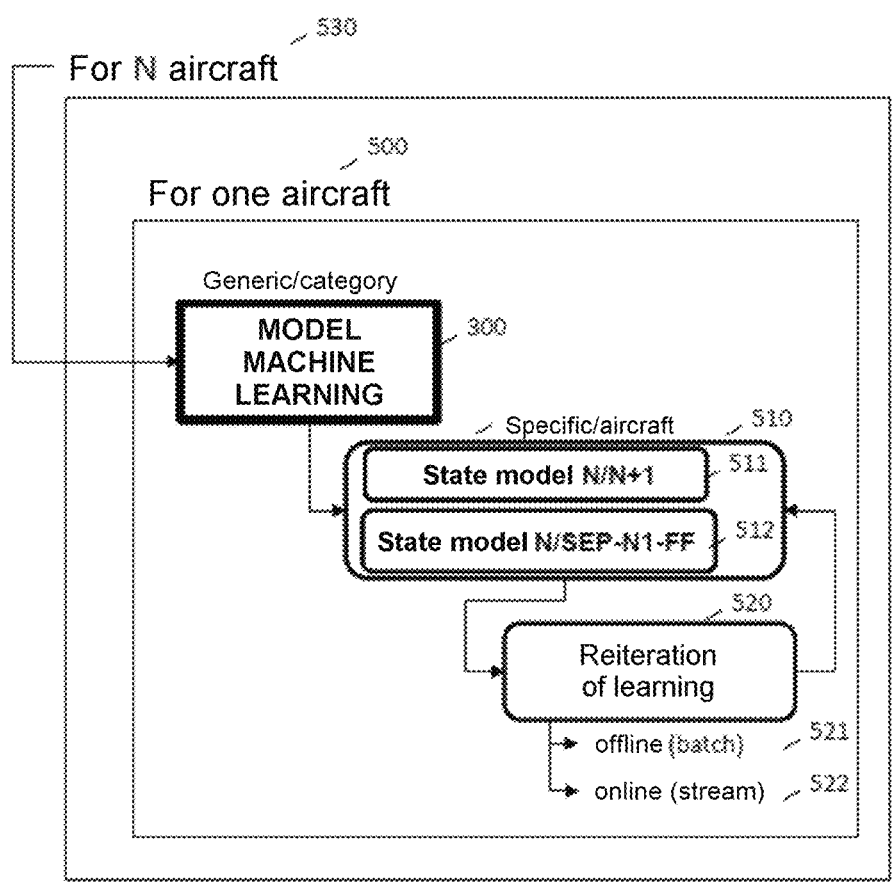
FIG. 5 illustrates various learning modes according to various embodiments of the invention.

FIG. 5 illustrates various learning modes according to various embodiments of the invention.

In one embodiment, for a given aircraft 500 for which it is desired to have better knowledge of its properties (e.g. in order to determine its flight behaviour), the method comprises a first step 512 of modelling the link between (i) the state of the aircraft and (ii) the parameters (SEP, FF, N1). To this end, the model is trained by machine learning on a large number of flight recordings relating to the aircraft type in question. In a second step, the model is on board (i.e. onboard implementation) and refined in order to refine, to reinforce or to improve it per serial number, i.e. so that it is specific or particular to the aircraft in question (each aircraft is unique, slightly different from the other aircraft in the same aircraft type or category). To this end, the (generic) model is made specific by machine learning performed on the flight data specific to the aircraft in question. The data may be (past) flight recordings for this aircraft (offline 521), or received live or by streaming (online 522).

This last embodiment is an "end-to-end" model: a learning model 300 (neural network for example) is trained with the aircraft state as input and SEP, FF and N1 as output. Next, the (existing) integrators are used with the outputs from this model in order to predict the future state of the aircraft.

What is learned for one aircraft 520 may be reproduced on the scale of a fleet of aircraft 530. It is then possible to match the generic model with an average over aircraft of the same type.

In one embodiment, for a given aircraft 500 for which it is desired to have better knowledge of its properties (in order to determine its flight behaviour), the method comprises a first step 511 of modelling the link between (i) the state of the aircraft at point N and (ii) the state of the aircraft at point N+1. This step comprises a step of using trajectory prediction/integration 230. To this end, the model is trained by machine learning on a large number of flight recordings relating to the aircraft type in question. In a second step, the model is on board (i.e. onboard implementation) and refined in order to refine, to reinforce or to improve it per serial number, i.e. so that it is specific or particular to the aircraft in question (each aircraft is unique, slightly different from the other aircraft in the same aircraft type or category). To this end, the (generic) model is made specific by machine learning performed on the flight data specific to the aircraft in question. The data may be (past) flight recordings for this aircraft (offline 521), or received live or by streaming (online 522).

The present invention may be implemented on the basis of hardware and/or software elements. It may be available as a computer program product on a computer-readable medium.

The machine learning may correspond to hardware architectures which can be emulated or simulated by computer (e.g. CPU-GPU), but occasionally not (learning-dedicated circuits may exist).

Depending on the embodiment, the method according to the invention may be implemented on or by one or more neural networks. A neural network according to the invention may comprise one or more neural networks chosen from the neural networks comprising: a) an artificial neural network; b) an acyclic artificial neural network, e.g. a multilayer perceptron, in contrast with recurrent neural networks; c) a feedforward neural network; d) a Hopfield neural network (a discrete-time recurrent neural-network model, the connection matrix of which is symmetric and zero on the diagonal, and the dynamics of which are asynchronous, a single neuron being updated for each unit time); e) a recurrent neural network (made up of interconnected units interacting nonlinearly and for which there is at least one cycle in the structure); f) a convolutional neural network ("CNN" or "ConvNet", which is a type of feedforward acyclic artificial neural network, by stacking multiple layers of perceptrons); or g) a generative adversarial neural network (GAN, which is a class of unsupervised learning algorithm).

In one embodiment, the learning calculations are performed offline on a ground computer.

Advantageously, if the computer is located on board an aircraft and has access to flight data, the model may be trained specifically to model, with greater accuracy, the particular aircraft on board which it is located, using reinforcement methods.

Advantageously, if the computer is located on board an aircraft and is connected to a parameter recorder, flight data may be used in a real-time architecture to improve knowledge of aircraft performance in real time.

In one variant embodiment, one or more steps of the method according to the invention are implemented in the form of a computer program hosted on an EFB (electronic flight bag).

In one variant embodiment, one or more steps of the method may be implemented within an FMS (flight-management-system) computer or in an FM function of a flight computer.

The invention claimed is:

1. A method for managing a flight of an aircraft, comprising the steps of:
   receiving with a processor data from recordings of the flight of an aircraft; said data comprising data from sensors and/or data from onboard avionics;
   generating a learning model by training the learning model on a large number of flight recordings relating to an aircraft type;
   further generating the learning model by generating links between a state of an aircraft and flight parameters based on the large number of flight recordings relating to the aircraft type;
   determining with the processor flight parameters representing an aircraft state of the aircraft at a point N on a basis of the received data;
   providing with the processor the flight parameters representing the aircraft state of the aircraft at a point N+1, wherein the aircraft state at point N+1 being determined by inputting the flight parameters representing the aircraft state at point N to the learning model modelling links between state of an aircraft and flight parameters, the model being learnt by means of machine learning by training on the large number of flight recordings; and
   using the flight parameters representing the aircraft state at point N+1 for trajectory prediction to assess aircraft performance, optimize flight operations, implement flight simulation, assist in mission management, assist in a piloting of the aircraft, and/or adjust avionic systems.

2. The method according to claim 1, the step of determining the state of the aircraft state of the aircraft at point N+1 on the basis of the aircraft state of the aircraft at point N comprising the steps of:
   determining the flight parameters SEP (Specific Excess Power), FF (Fuel Flow) and N1 on the basis of the aircraft state at point N by applying a model learnt by machine learning; and
   determining the aircraft state at point N+1 on the basis of values of flight parameters SEP, FF and N1 by means of trajectory calculation,
   wherein the SEP value denotes energy available for the aircraft to climb, the FF value denotes a variation in a fuel weight and the N1 value denotes a speed of rotation of a first stage of an engine, which influences fuel consumption.

3. The method according to claim 1, the machine learning being unsupervised.

4. The method according to claim 1, the machine learning being supervised.

5. The method according to claim 1, the machine learning being performed offline.

6. The method according to claim 1, the machine learning being performed online.

7. The method according to claim 1, the machine learning comprising one or more algorithms selected from the algorithms comprising: support-vector machines; classifiers; neural networks; decision trees and/or steps from statistical methods such as Gaussian mixture models, logistic regression, linear discriminant analysis and/or genetic algorithms.

8. A computer program product, said computer program product comprising non-transitory code instructions for performing the steps of the method according to claim 1 when said computer program product is executed on a computer.

9. A system for implementing the steps of the method according to claim 1, the system comprising one or more avionic systems such as a flight management system FMS and/or an electronic flight bag EFB.

10. The system according to claim 9, further comprising one or more neural networks chosen from the neural networks comprising: an artificial neural network; an acyclic artificial neural network; a recurrent neural network; a feedforward neural network; a convolutional neural network; and/or a generative adversarial neural network.

11. The method according to claim 1, wherein the flight parameters comprise at least SEP (Specific Excess Power) values, FF (Fuel Flow) values, and N1 values.

12. A method for managing a flight of an aircraft, comprising the steps of:
   receiving with a processor data from recordings of the flight of an aircraft; said data comprising data from sensors and/or data from onboard avionics;
   generating a learning model by training the learning model on a large number of flight recordings relating to an aircraft type utilizing as input a state of an aircraft and flight parameters as an output; and
   further generating the learning model by generating links between the state of an aircraft and the flight parameters based on the large number of flight recordings relating to the aircraft type utilizing as input the state of the aircraft and the flight parameters as the output;
   determining with the processor flight parameters representing an aircraft state of the aircraft at a point N on a basis of the received data;
   providing with the processor the flight parameters representing the aircraft state of the aircraft at a point N+1, wherein the aircraft state at point N+1 being determined by inputting the flight parameters representing the aircraft state at point N to the learning model modelling links between state of an aircraft and flight parameters, the model being learnt by means of machine learning by training on the large number of flight recordings; and
   using the flight parameters representing the aircraft state at point N+1 for trajectory prediction to assess aircraft performance, optimize flight operations, implement flight simulation, assist in mission management, assist in a piloting of the aircraft, and/or adjust avionic systems.

13. The method according to claim 12, wherein the flight parameters comprise at least SEP (Specific Excess Power) values, FF (Fuel Flow) values, and N1 values.

14. A method for managing a flight of an aircraft, comprising the steps of:
   receiving with a processor data from recordings of the flight of an aircraft; said data comprising data from sensors and/or data from onboard avionics;
   generating a learning model by training the learning model on a large number of flight recordings relating to a specific aircraft;
   further generating the learning model by generating links between a state of an aircraft and flight parameters based on the large number of flight recordings relating to the specific aircraft;

determining with the processor flight parameters representing an aircraft state of the aircraft at a point N on a basis of the received data;

providing with the processor the flight parameters representing the aircraft state of the aircraft at a point N+1, wherein the aircraft state at point N+1 being determined by inputting the flight parameters representing the aircraft state at point N to the learning model modelling links between state of an aircraft and flight parameters, the model being learnt by means of machine learning by training on the large number of flight recordings; and using the flight parameters representing the aircraft state at point N+1 for trajectory prediction to assess aircraft performance, optimize flight operations, implement flight simulation, assist in mission management, assist in a piloting of the aircraft, and/or adjust avionic systems.

15. The method according to claim 1, further comprising:

generating the learning model by training the learning model on a large number of flight recordings relating to a specific aircraft utilizing as input a state of an aircraft and flight parameters as an output; and further generating the learning model by generating links between the state of an aircraft and the flight parameters based on the large number of flight recordings relating to the specific aircraft utilizing as input the state of the aircraft and the flight parameters as the output.

16. The method according to claim 15, wherein the flight parameters comprise at least SEP (Specific Excess Power) values, FF (Fuel Flow) values, and N1 values.

* * * * *